UNITED STATES PATENT OFFICE.

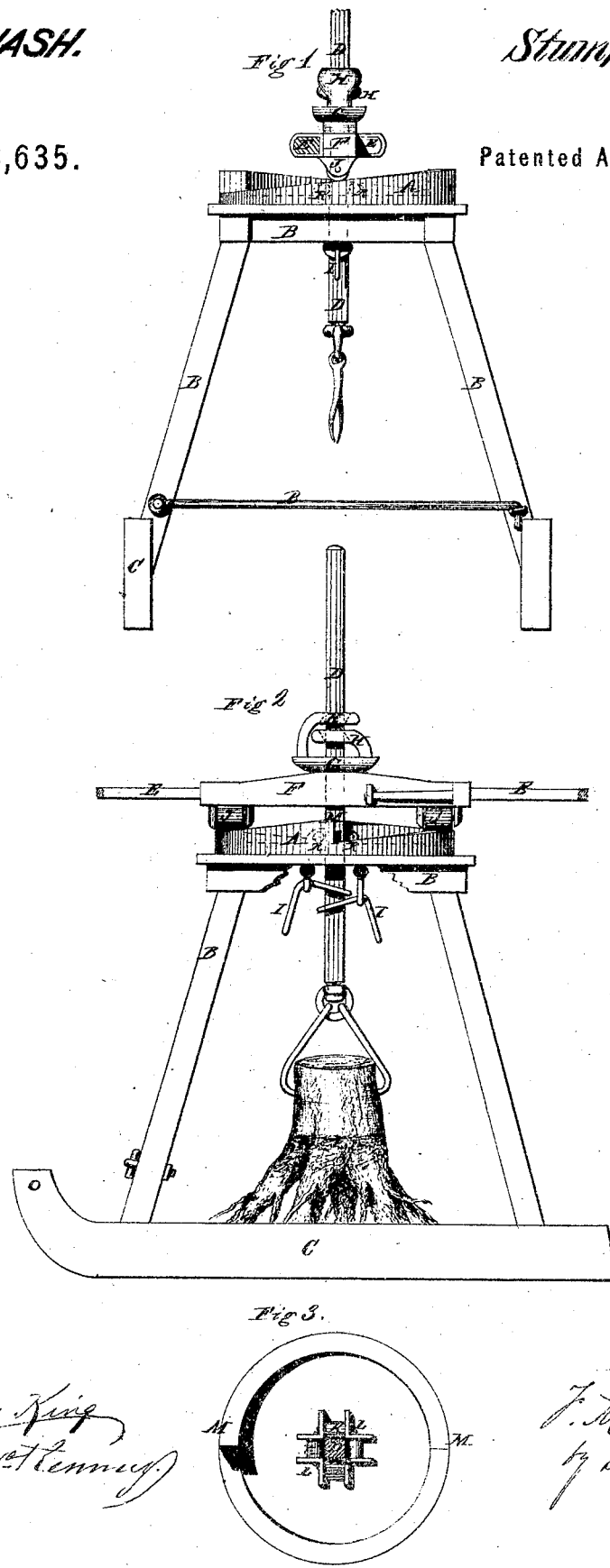

FRANCIS M. NASH, OF STOCKTON, MINNESOTA, ASSIGNOR TO HIMSELF AND WILLIAM H. STEVENS, OF SAME PLACE.

IMPROVEMENT IN STUMP-EXTRACTORS.

Specification forming part of Letters Patent No. 118,635, dated August 29, 1871.

*To all whom it may concern:*

Be it known that I, FRANCIS M. NASH, of the village of Stockton, in the county of Winona and State of Minnesota, have invented certain Improvements in Stump-Extractors, of which the following is a specification, reference being had to the accompanying drawing.

My invention consists in a novel combination and arrangement of devices for raising a bar or rod, which is to be connected with the stump or weight.

Figure 1 is a front view of my improved machine. Fig. 2 is a side view of the same in position to operate upon a stump, and Fig. 4 is a top-plan view of the bed-plate of the machine.

In constructing my machine I first build a strong upright frame, B, to receive the operating parts, and mount it upon two runners, C, so that it may be readily hauled about from place to place. On top of this frame I secure a bed-plate, A, of a circular form, having two semicircular inclined planes, M, at its outer edge, both inclined in the same direction. Through the center of this plate I make an opening and insert therein a vertical square bar, D, of iron, so that it may slide up and down through the plate. On the bed-plate around the central opening I form flanges L, of the form shown in Fig. 3, and between these flanges I mount four anti-friction rollers, R, so as to bear against the four sides of bar D, to hold it in position and enable it to move easily up and down, but at the same time prevent it from turning around. I next provide a strong metal bar or yoke, F, having a vertical hole through its middle, and a roller, J, mounted under each end. This yoke I slip down over the upper end of the vertical bar D, as shown in Figs. 1 and 2, the bar passing through the central hole in the yoke and the rollers J of the latter resting upon the inclines M. The yoke thus arranged may be turned horizontally around the rod D as a center, so as to cause the rollers J to ride up the inclines and thereby raise the yoke. When the yoke has completed half a revolution each roller will have reached the upper end of its incline M, and will then, upon the motion being continued, pass over said end and permit the yoke to descend until the rollers bear on the lower ends of the next incline. It will thus be seen that the yoke is raised and then permitted to drop down twice in each revolution. Onto the bar D I slip loosely a plate or washer, G, and permit it to rest upon the yoke F, as shown. I next provide two strong metal dogs, H, each consisting of a plate provided with a depending arm at one side, and a square hole obliquely through the middle of the proper size to receive rod or bar D. These dogs, I, slip down upon the bar D, so that their depending arms bear upon washer G on opposite sides of the bar. The dogs, supported in this manner by their arms only, permit the bar D to slide freely upward through them, but bite firmly upon and prevent it from being moved downward. When, therefore, the yoke F is raised by being turned it raises the washer G and dogs H, and the latter, biting upon the bar D, raise it also, so that each time the yoke rises it lifts the bar D. Below the bed-plate A I suspend two dogs, I, which engage with the bar D in a manner similar to the dogs H, so as to prevent any downward movement of bar D, while permitting a free upward movement of the same. As the bar D is raised by the motion of the yoke the dogs, I, gripe upon it and hold it from descending when the yoke drops down at the end of the inclines. As the yoke descends the washer G and dogs H slide down upon the bar D and the dogs take a new hold thereon, and, when the yoke rises, lift the bar to a higher point than before. Thus it will be seen that when the yoke rises bar D is raised, and that when the yoke descends the bar is held stationary to permit the dogs H to slide down and take another hold for the next lift, and so on repeatedly, the bar being lifted twice during each revolution of the yoke. In this manner the bar D is drawn up through the bed-plate with very great power. By raising the dogs H and I their hold upon the bar is loosened, and it is permitted to descend. The upper dogs H are raised and supported by inserting a forked wedge between them and the washer G, astride of bar D. The dogs I are provided with depending arms or handles back of the point of suspension, so that by pressing inward on said arms the inner ends of the dogs are raised and released from the bar.

In extracting a stump with my machine the latter is drawn over the stump and the bar D lowered and made fast thereto, as shown in Fig. 2. The yoke is then revolved by either animal or manual power applied to the sweeps or levers E; and in this manner the bar is elevated and the stump raised from its place.

The machine is also applicable for raising heavy weights, such as stones, &c.

A machine thus constructed is very powerful, simple, and cheap to build, and also very portable.

Instead of making the washer or plate G separate from the yoke it may be formed thereon, and a part thereof, although it is not considered desirable to do so.

Having thus described my invention, what I claim is—

A hoisting-machine, consisting of a suitable frame having the inclines M mounted thereon, with the bar D, yoke F, plate G, and dogs H and I, arranged to operate substantially as described.

FRANCIS M. NASH.

Witnesses:
JOHN KEYES,
J. B. CROOKSTON.